March 24, 1931.    J. N. CRIDER    1,797,606
METHOD OF PRESERVING FOWL.
Filed May 16, 1930
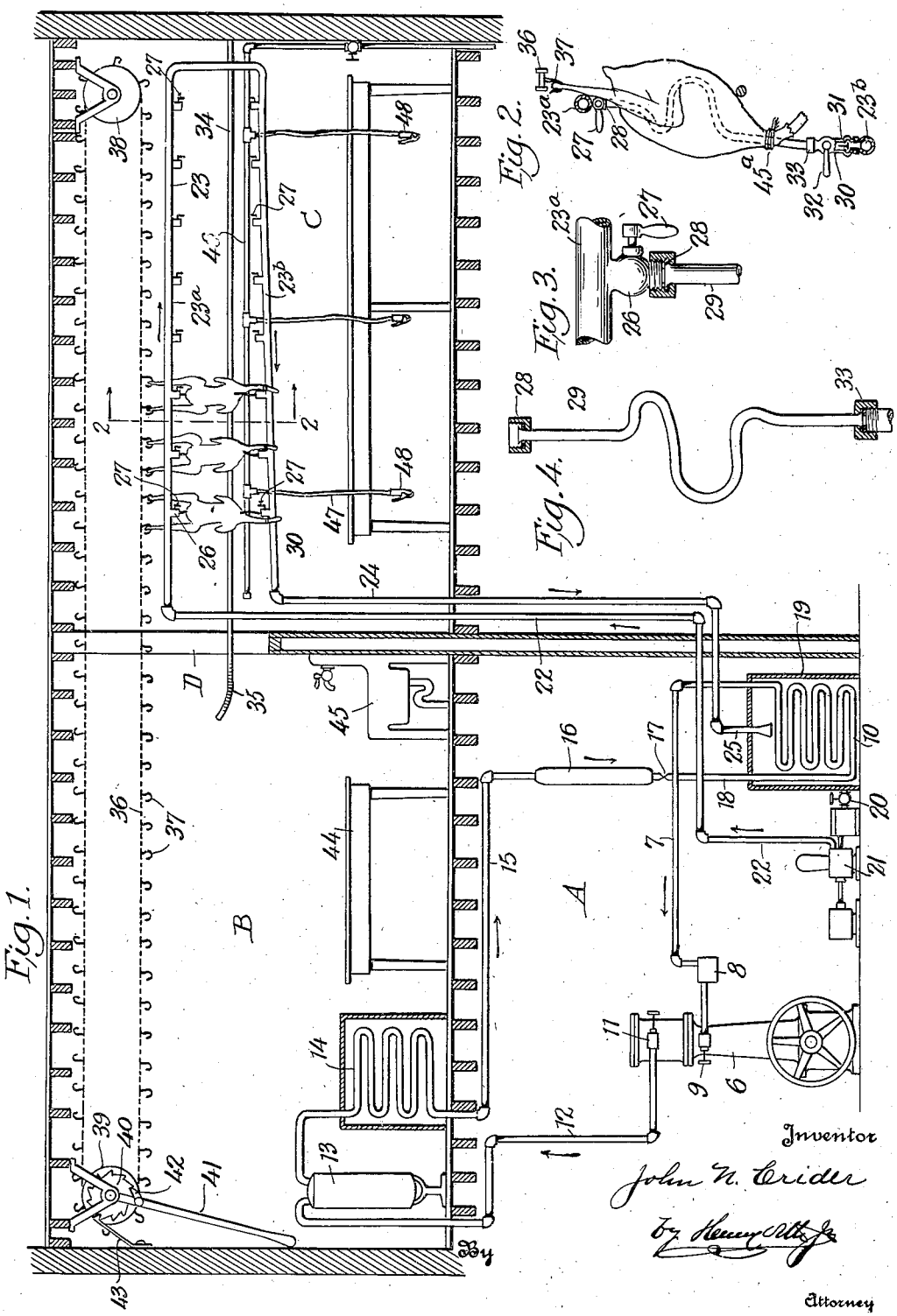
Inventor
John N. Crider
By Henry Alt Jr.
Attorney Patented Mar. 24, 1931

1,797,606

UNITED STATES PATENT OFFICE

JOHN N. CRIDER, OF WOODSIDE, NEW YORK

METHOD OF PRESERVING FOWL

Application filed May 16, 1930. Serial No. 453,029.

My invention relates to preserving dressed and drawn fowl by refrigeration for shipment, and comprises filling the cavity of the dressed fowl with water and freezing the water therein to ice, thereby filling the entire cavity of the fowl with ice and preserving the natural shape of the dressed fowl, as well as preserving it against deterioration for a considerable length of time.

Referring to the drawings, in which like parts are similarly designated—

Figure 1 is a view showing a plan for carrying out my invention.

Fig. 2 is a cross section on an enlarged scale on line 2—2 of Fig. 1.

Fig. 3 is a detail of a pipe connection, and

Fig. 4 is a view of the freezing tube.

In a cellar A or other suitable place I have ammonia refrigerating apparatus, comprising a compressor 6 receiving ammonia gas through a pipe line 7 including a low pressure trap 8 and a cut-off valve 9 from a brine cooling coil 10.

The compressor discharges compressed ammonia gas through a cut-off valve 11 to a pipe line 12 connected to a separator 13 in the slaughtering room B above, or at any other suitable place. The separator is connected to a condensing coil 14, which is connected by pipe 15 to a receiver 16 for liquid ammonia. This receiver discharges through a reducing valve 17 and pipe 18 into the cooling coil 10 contained in a brine tank 19.

Brine in tank 19 passes through a valve 20 to a brine pump 21, thence by pipe 22 to the supply leg 23$^a$ of a loop 23 in a freezing room C, the other leg 23$^b$ of which is connected to a brine return pipe 24 discharging through a non-splash nozzle 25 into the brine tank 19.

Any other type of freezing or cooling apparatus may be used to cool the brine below the freezing temperature of water.

The upper leg 23$^a$ of the loop 23 is provided with downwardly extending, suitably spaced discharge nipples 26 each provided with a cut-off cock or valve 27. Each nipple is also provided with a pipe coupling collar 28 for a freezing tube 29, Figs. 3 and 4, of oil paper, thin copper or any other material. The other leg 23$^b$ of the loop 23 is preferably in a vertical plane in front of leg 23$^a$ as shown in Fig. 2.

The lower leg 23$^b$ is provided with similarly spaced upwardly extending nipples 30, each of which is provided with a non-return valve of any type, and above this valve with a cut-off cock or valve 32 and a pipe coupling 33 like the coupling collar 28. Between the collars 28 and 33 extend the freezing tubes 29.

Substantially parallel to the legs of the loop 23 and between them is a carcass supporting rod 34 extending from the freezing room C through an opening D between it and the slaughtering room B, where the end of the rod is bent or curved slightly to the rear at 35 near the opening D and in the slaughtering room.

Parallel to the loop 23 and above it is an endless conveyor 36 of any type, provided with spaced hanger hooks 37. The conveyor passes around a wheel 38 in the freezing room C and a similar wheel 39 in the slaughtering room B. This latter wheel is provided with a ratchet wheel 40, an operating handle 41 and a spring urged pawl 42. A detent pawl 43 prevents reverse travel of the carrier.

In the slaughtering room B is a slaughtering bench 44 and sink 45 for the supply of washing water.

In the freezing room is a water pipe line 46 to which short spaced lengths of hose 47 are connected and provided with suitable nozzles 48 from which the carcasses are filled with water.

The operation is as follows:

The pump 21 maintains circulation of brine through the loop 23, which brine is cooled by the ammonia apparatus shown, or by other means.

The fowls are slaughtered, dressed and drawn in the room B. They are drawn at the vent, as usual, and crops taken from the breast, care being taken to make the opening as far up the neck as possible. Each carcass is washed out thoroughly, its giblets are cleansed and dropped into the vent, the fowl is then hung up by both feet or legs on the hooks 37 on the lower stretch of the conveyor.

After a number of them have been so hung the conveyor is progressed by operating the handle 41 to pass the fowls to the freezing room, the fowl first coming in contact with the curved or bent end 35 of bar 34, and as they pass through opening D into the freezing room this bar holds the carcasses forward, as shown in Fig. 2. A freezing tube 29 is provided with two coupling collars, the two ends of the tube are then flared and one of the collars and tube passed through the cavity in the carcass. The collars are then screwed to their respective nipples between legs 23$^a$ and 23$^b$ of the loop 23 and wire or cord 45$^a$ tied about the neck of the fowl to prevent water from leaking from the cavity of the fowl. The cocks 27 and 32 of the respective nipples are then opened to permit cold brine from the brine supply leg 23$^a$ of the loop to pass through the freezing tube 29 to the brine discharge leg 23$^b$ of the loop.

The cavity in the fowl is then filled with water from one of the hose lengths 47.

By the time a further number of fowls have been prepared and hung on the hooks in the slaughtering room the water in those in the freezing room has been frozen. The cock 27 is then closed and the freezing tube 29 severed at the vent, the brine in the tube draining into the lower leg 23$^b$ of the freezing loop 23. The lower cock 32 is then closed and the freezing tube severed at the neck of the fowl leaving a portion of this tube embedded in the block of ice that fills every portion of the cavity. The fowls are then removed from the hooks and packed.

By this method the fowl are cleansed and dressed ready to be cooked without further cleansing or dressing on the part of the consumer, as soon as the blocks of ice in them are melted or removed. They always have a plump appearance and the weight is about the same as an undressed fowl.

I claim—

1. The method of preserving fowl, which comprises dressing and drawing the fowl, filling the cavity in the fowl with water, and freezing a block of ice in the cavity.

2. The method of preserving fowl, which comprises dressing and drawing the fowl, cleansing the giblets, placing them in the cavity of the fowl, filling the cavity with water and freezing the water.

3. The method of preserving fowl, which comprises dressing and drawing the fowl, passing a freezing tube into the cavity of the fowl, filling the cavity with water and freezing the water.

4. The method of preserving fowl, which comprises dressing and drawing the fowl, passing a freezing tube through the cavity, filling the cavity with water, freezing the water, cutting the ends of the tube near the surface of the fowl and leaving a portion of the tube in the ice block filling the cavity.

5. The method of preserving fowl, which comprises dressing and drawing the fowl, placing the giblets in the cavity, passing a freezing tube through the cavity, filling the cavity with water, freezing the water, cutting the ends of the tube near the surface of the fowl and leaving a portion of the tube in the ice block filling the cavity.

6. A drawn and dressed fowl having a block of ice therein conforming to and filling the cavity of the fowl.

7. A drawn and dressed fowl having the cavity, with the giblets therein, filled with a block of ice conforming to and filling the cavity.

In testimony that I claim the foregoing as my invention, I have signed my name hereto.

JOHN N. CRIDER.